United States Patent
Blackmon

[19]

[11] Patent Number: 5,948,333
[45] Date of Patent: Sep. 7, 1999

[54] METHOD FOR CREATING IMITATION MARBLE FACADE FOR OBJECTS

[75] Inventor: Wilton Blackmon, Dothan, Ala.

[73] Assignee: Replica Plastics, Dothan, Ala.

[21] Appl. No.: 09/082,904

[22] Filed: May 21, 1998

[51] Int. Cl.$^6$ .......................... B29C 44/06; B29C 44/12
[52] U.S. Cl. .......................................... 264/46.4; 264/255
[58] Field of Search ................................... 264/46.4, 255

[56] References Cited

U.S. PATENT DOCUMENTS

| | | | |
|---|---|---|---|
| 3,673,617 | 7/1972 | Schulz, Jr. | 264/46.6 |
| 3,773,886 | 11/1973 | Starr et al. | 264/255 |
| 4,086,318 | 4/1978 | Garasi et al. | 264/255 |
| 4,186,536 | 2/1980 | Piazza | 264/46.4 |
| 4,244,993 | 1/1981 | Platka, III et al. | 264/225 |
| 4,248,816 | 2/1981 | Sheridan | 264/255 |
| 5,087,405 | 2/1992 | Maker | 264/255 |
| 5,133,912 | 7/1992 | Hagiwara et al. | 264/46.4 |
| 5,213,747 | 5/1993 | Lippert | 264/255 |
| 5,628,949 | 5/1997 | Bordener | 264/255 |
| 5,728,332 | 3/1998 | Frisch et al. | 264/46.4 |

FOREIGN PATENT DOCUMENTS

| | | | |
|---|---|---|---|
| 56-161164 | 12/1981 | Japan | 264/46.4 |
| 57-59730 | 4/1982 | Japan | 264/46.4 |

*Primary Examiner*—Allan R. Kuhns
*Attorney, Agent, or Firm*—Robert J. Veal; Veal & Associates

[57] ABSTRACT

The present invention generally relates to imitation marble objects. More particularly, the present invention relates to a method for producing imitation marble fixtures such as tubs, walls, vanities, etc. A method for producing imitation marble fixtures, comprising the steps of applying a first layer over a prepared mold which outlines the features of the desired product, wherein the first layer comprises a clear polyester gel coat. Then applying a second layer over the first layer, the second layer comprises a pattern of swirls and veins permeated throughout a matching polyester gel coat. Thereafter, applying a third layer over the second layer, the third layer comprises calcium carbonate with polyester resin for the purpose of providing the base color of the imitation marble fixture. Finally, applying a layer of polyurethane foam, wherein the polyurethane foam consists of equal parts of Polymeric Diphenylethane Diisocyanate and Polyol Tertiaryamine. Blending of the aforementioned materials produces a chemical reaction causing expansion of the components for the purpose of filling the mold thereby defining the fixture. The present invention provides a method which will create a imitation marble fixture in a much more time and cost efficient manner than previous methods such as that used to produce cultured marble. Further, the invention also provides a method which produces objects which have a weight only a fraction of the weight of similar objects made of cultured marble.

12 Claims, 1 Drawing Sheet

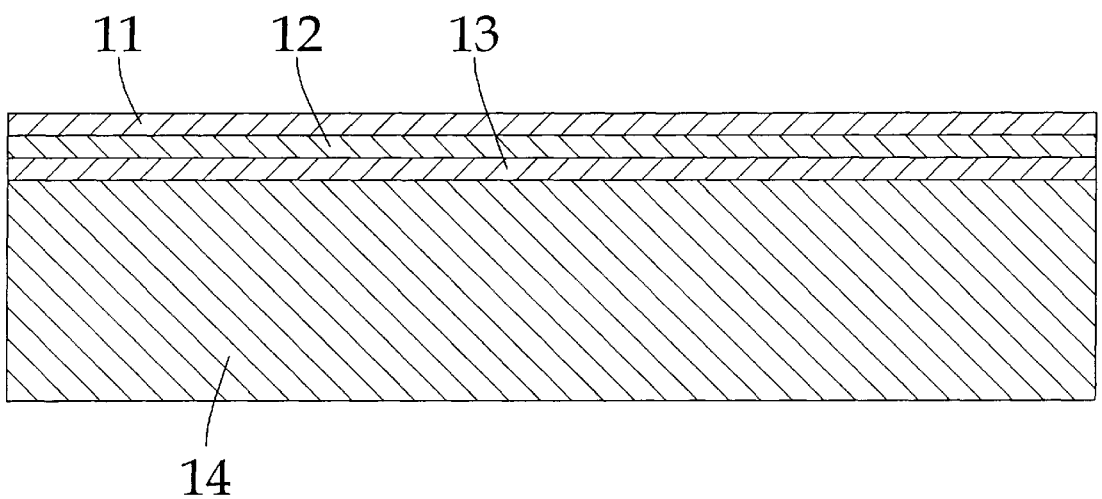

METHOD FOR CREATING IMITATION MARBLE FACADE FOR OBJECTS

FIELD OF INVENTION

The present invention generally relates to decorative materials used in the construction industry and particularly to such materials as are used as a replacement for marble. More particularly, the present invention relates to a method for producing an imitation marble for use in imitation marble objects such as tubs, walls, vanities, etc.

BACKGROUND OF INVENTION

In the construction industry, cultured marble is utilized to achieve a marbled look thereby providing a substitute for the more costly natural marble. Cultured marble is made by combining a matrix of specially formulated resin, ground limestone, color (powder pigments), and MEKP (methel ethyl keytone peroxide), a hardening agent. The mold releasing agent is applied to the mold just prior to spraying the clear gelcoats. Thereafter, gel coat is sprayed into a mold which defines the desired product. The matrix, which is mixed in a large vat, is then poured into the coated mold. Air vibrators attached to the mold remove trapped air and settle the matrix evenly. Thereafter, the mold is left undisturbed for a lengthy period of at least eight hours, allowing the product to cure. Finally, the product is removed from the coated mold, cleaned, and then buffed to a high gloss finish.

Cultured marble, however, poses several problems. For instance, although lighter than natural marble, cultured marble is still a relatively heavy product. Cultured marble, for example, has a weigh approximately five times that of equivalent products produced by the present inventor's method. Additionally, production time for cultured marble is quite lengthy. Cure time alone requires at least eight hours. Thus, there is a need for a method which will produce an imitation marble object which is much lighter in weight and therefore is much easier to handle and to transport. Moreover, there is a need for a method in which an imitation marble product is produced in a much more time and cost efficient manner.

SUMMARY OF INVENTION

The principal object of the present invention is to simplify the construction industry with a lightweight easily manufactured product that replicates cultured marble.

In furtherance of the principal object another object of the present invention is to provide a method for creating imitation marble fixtures such as tubs, walls, vanities, etc.

It is also an object of the present invention to utilize optical layers wherein application of the different layers at different thickness form an optical stack of coats producing a more authentic marbled appearance.

Another object of the present invention is to reduce the material required to produce the base coloring as well as the veins and swirls.

Yet another object of the present invention is to provide a method for producing imitation marble objects which will have a weight which is a fraction of cultured marble objects.

It is also an object of the present invention to provide a method which will reduce the overall cure time for creating imitation marble objects thereby producing a much more time and cost efficient method of producing imitation marble objects.

Other features, objects and advantages of the present invention will become apparent from a reading of the following description as well as of the appended drawings.

BRIEF DESCRIPTION OF THE FIGURE

Apparatus and method embodying the features of the present invention are depicted in the attached figure which forms a portion of this disclosure and wherein:

The figure is a schematic drawing illustrating an imitation marble object such as a rectangular slab of the type used in creating the bottom of an imitation marble bathtub.

DESCRIPTION OF THE PREFERRED EMBODIMENTS

Referring to the drawings, it may be seen that the preferred embodiment of the present invention utilizes the creation of a plurality of optical layers wherein application of the different layers at different levels of thickness form an optical stack of coats producing a marbled appearance on a substrate in the form of a desired fixture or building component. The method of producing a fixture with a marbled exterior appearance, illustrated in the figure, like conventional cultured marble, begins with applying a first layer 11 over a prepared mold which outlines the features of the desired product, wherein said first layer comprises a suitable clear polyester gel coat for the purpose of providing a protectant as well as a polished finish for the imitation marble fixture. The gel coat is applied by spraying the substance on the interior of the mold. A suitable gel coat thickness is between 18 to 20 mils. The mold for manufacturing the product may be made of metal or polyester resin with fiberglass.

After applying the gel coat, a second layer 12 is applied over the first layer. The second layer comprises a pattern of swirls and veins permeated throughout a matching polyester gel coat. Thus, the veins and swirls, achieved by using printer's ink, permeated throughout the clear matching gel coat at varying levels, create the illusion of the depth achieved by lines and curves within the base color of natural marble. The swirls and veins are applied in a random manner thereby creating a more realistic marble appearance. However, unlike the method for creating cultured marble which requires one to use color for the veins and swirls throughout the matrix which defines the object, the color used to create the veins and swirls in the present method is only used in the thin second layer thereby creating the same effect with less material and ink. A preferable thickness of the second layer is between 10 and 20 mils.

Thereafter, a third layer 13 is applied over said second layer. The third layer comprises calcium carbonate with polyester resin and pigment for the purpose of providing the base color of the imitation marble fixture. The calcium carbonate may be mined or may be obtained from crushed oyster shells. The third layer has a cure time between 15 to 20 minutes at a temperature about 77° F. The first, second, and third layer form an overall exterior finish with a thickness between 55 to 60 mils. In comparison, the matrix of the prior art could easily be one-half-inch or more in thickness, with a weight per unit volume equal to or greater than that of the exterior layers of the present invention.

Thus, in addition to creating a more realistic marbleized appearance, the 55 to 60 mils thickness of the first, second, and third layers also reduce the weight of the imitation marble object to a fraction of the weight of a similar object created with cultured marble. Moreover, adding the third layer in this manner allows one to have a purer base color. That is, applying the base coat independent of the colors used for the veins and swirls prevents the colors from overmixing and diluting. Consequently, more defined veins and swirls, as well as the base color, is achieved in less time.

Further, this method allows a wider variety of base colors to be used without the potential blending problems which could occur as a result of mixing certain base colors with the colors used for the veins and swirls. In addition, applying the base color in this manner, as opposed to throughout the marble object as with cultured marble, also conserves the pigment component used to create the base color.

Subsequently, a fourth layer 14 is applied. The fourth layer, which fills the inside of the object, is polyurethane foam, which has a density substantially less than that of the matrix of conventional cultured marble. The polyurethane foam consists of equal parts of polymeric diphenylethane diisocyanate and polyol tertiaryamine. Blending of the aforementioned components produces a chemical reaction causing expansion of the components for the purpose of filling the mold thereby defining the fixture as is well known. Unlike the eight hour cure time required for cultured marble, the cure time for the chemical reaction of the polyurethane mixture is between 30 to 35 minutes. Therefore, in addition to being much lighter, the polyurethane foam used to fill the imitation marble object is also a much more time and cost efficient component.

Finally, the fixture may be demolded and cleaned for use. When product is removed from mold, excess polyurethane is removed from the back of the product to obtain a smooth backing, for attaching to wall surfaces (not from bottom of mold). Excess polyurethane can be removed by an ordinary cutting implement and provides a much cleaner surface than the limestone matrix of cultured marble, which must be removed with a specialized tool. Accordingly, in addition to the aforementioned advantages, the polyurethane filling is also easier to remove than excess cultured marble. Moreover, the final product has a weight approximately 20 percent of the weight of cultured marble.

There has been disclosed heretofore the preferred embodiments of the present invention contemplated. However, it will be obvious to those skilled in the art that there may be modifications to the present invention without departing from this present invention in its broader scope.

Having set forth the nature of the invention, what is claimed is:

1. A method for producing imitation marble fixtures, comprising the steps of:
    a) applying a clear polyester gel coat as a first layer over a prepared mold which outlines the features of the desired product,
    b) applying a pattern of swirls and veins as a second layer over said first layer;
    c) applying a combination of calcium carbonate with polyester resin as a third layer over said second layer, said third layer providing the base color of said imitation marble fixture; and
    d) applying polyurethane foam as a filler for the remaining mass of said fixture.

2. A method according to claim 1, wherein said clear polyester gel coat layer is applied in a thickness between 18 to 20 mils.

3. A method according to claim 1, wherein said swirls and veins of applying step b permeate throughout said matching gel coat at varying levels of depth thereby creating a more realistic marble appearance.

4. A method according to claim 3, wherein said swirls and veins are applied using printer's ink.

5. A method according to claim 1, wherein said swirls are applied in a thickness between 10 to 20 mils.

6. A method according to claim 5, further comprising conditioning said swirls for a cure time between 15 to 20 minutes at a temperature about 77° F.

7. A method according to claim 1, wherein said layer of calcium carbonate and resin is applied to a thickness between 10 to 20 mils.

8. A method according to claim 7, further comprising curing said layer of calcium carbonate and resin for a cure time of between 15 to 20 minutes at a temperature about 77° F.

9. A method according to claim 1, wherein said first layer, said second layer and said third layer of steps a, b, and c form an overall exterior finish with a thickness between 55 to 60 mils.

10. A method according to claim 1, wherein said polyurethane foam comprises equal parts of polymeric diphenylethane diisocyanate and polyol tertiaryamine.

11. A method according to claim 1, further comprising removing said fixture fro m said mold and cleaning said fixture by removing any excess polyurethane.

12. A method according to claim 1, wherein said product has a weight approximately 20 percent of the weight of cultured marble.

* * * * *